No. 694,297. Patented Feb. 25, 1902.
W. P. NISBETT & P. ANDREWS.
MACHINE FOR CUTTING STEREOTYPE PLATES.
(Application filed May 11, 1901.)

2 Sheets—Sheet 1.

Witnesses
Edwin F. McKee
H. Schmidt

Inventors
William P. Nisbett
Peter Andrews
By Victor J. Evans
Atty.

No. 694,297. Patented Feb. 25, 1902.
W. P. NISBETT & P. ANDREWS.
MACHINE FOR CUTTING STEREOTYPE PLATES.
(Application filed May 11, 1901.)
(No Model.) 2 Sheets—Sheet 2.
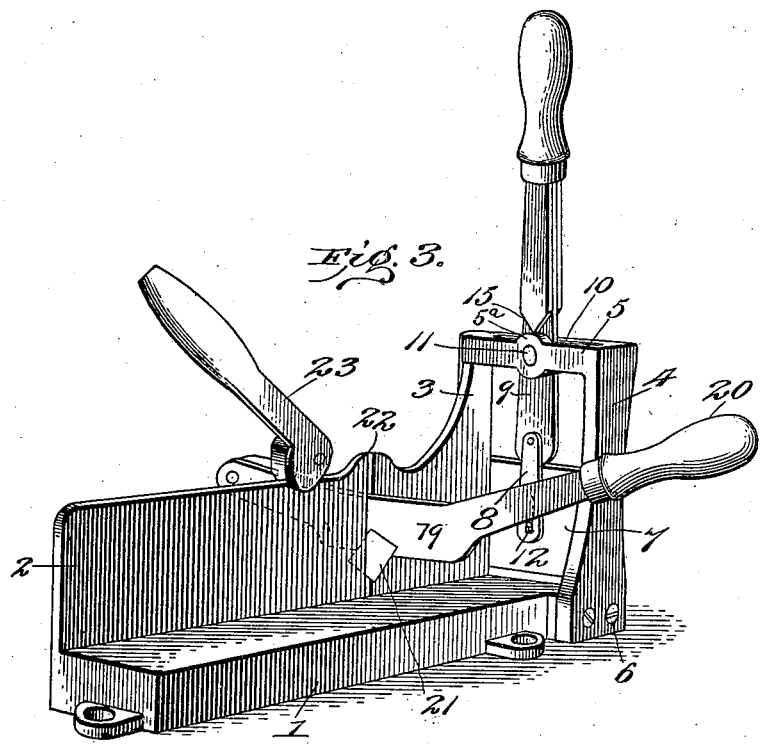
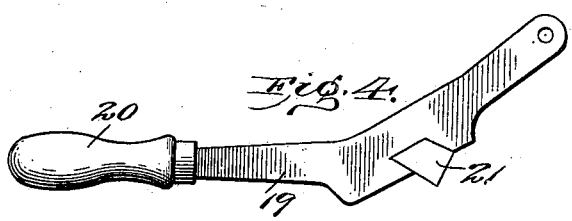
Witnesses:
Edwin G. McKee
H. Schmidt.
Inventors
William P. Nisbett
Peter Andrews
By Victor J. Evans.
Atty.

UNITED STATES PATENT OFFICE.

WILLIAM P. NISBETT AND PETER ANDREWS, OF BIG RAPIDS, MICHIGAN.

MACHINE FOR CUTTING STEREOTYPE-PLATES.

SPECIFICATION forming part of Letters Patent No. 694,297, dated February 25, 1902.

Application filed May 11, 1901. Serial No. 59,850. (No model.)

*To all whom it may concern:*

Be it known that we, WILLIAM P. NISBETT and PETER ANDREWS, citizens of the United States, residing at and whose post-office address is Big Rapids, in the county of Mecosta and State of Michigan, have invented new and useful Improvements in Machines for Cutting Stereotype-Plates, of which the following is a specification.

Our invention relates to machines for cutting stereotype-plates; and its object is to provide a machine for the purpose named of simple, inexpensive, and durable construction, in which the use of springs is avoided and which may be readily adjusted and effectively operated by a single stroke of the cutter.

The construction of the improvement will be fully described hereinafter in connection with the accompanying drawings, which form part of this specification.

Figure 1:
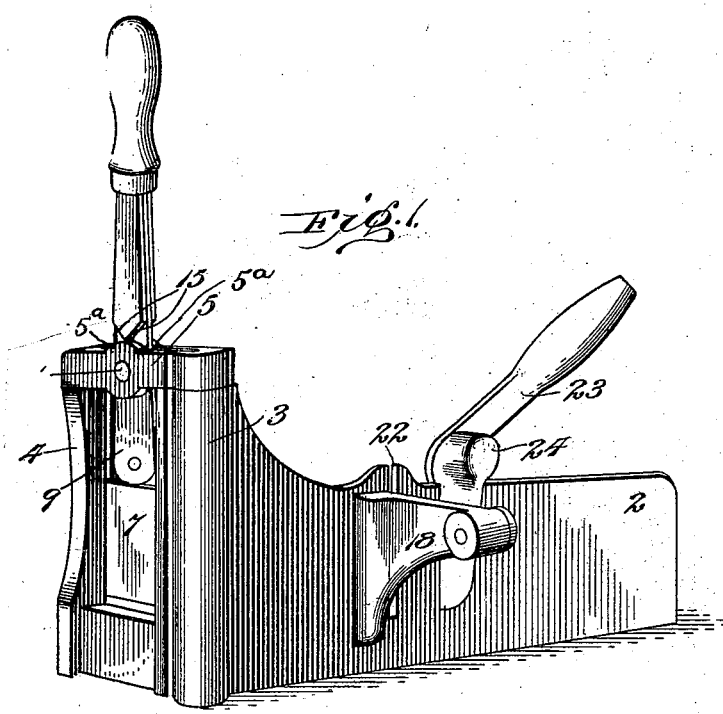
Figure 2:
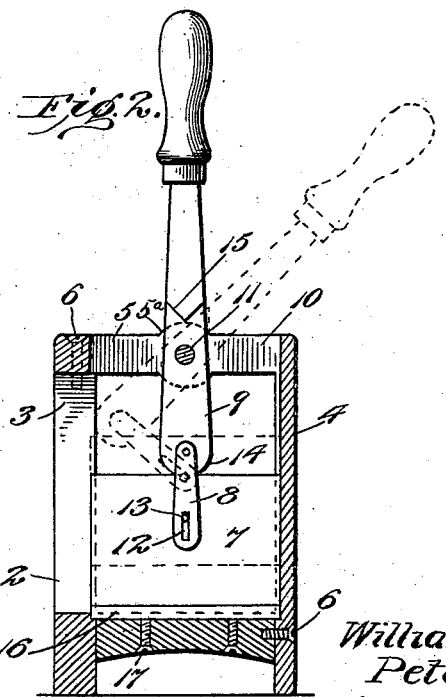

In the drawings, Figure 1 is a view in perspective of a machine embodying the invention. Fig. 2 is a vertical section of the same. Fig. 3 is a perspective view taken from the side of the machine opposite to that shown in Fig. 1, and Fig. 4 is a side elevation of the trimming-knife detached from the machine.

The reference-numeral 1 designates the base of the machine, and 2 the side plate thereof, the latter extending upward from one side of the base and having an upwardly-projecting arm 3, which forms one side of the frame within which the knives operate. The opposite side 4 and top 5 of the knife-supporting frame are preferably formed integral and of inverted-L shape and secured to the base 1 and the side plate 2 by screws 6.

The inner sides of the arm 3 and side 4 of the frame are formed with vertical grooves, within which is slidably supported a cutting-blade 7, connected by means of a link 8 with the lower end of a lever 9, which extends through an elongated slot 10, formed in the top bar 5, and is fulcrumed on a cross-pin 11.

The upper end of the link 8 is pivotally secured to the lever, and said link is formed near its lower end with an elongated slot 12, into which extends a pin 13, projecting from one side of the cutter 7. The lower end 14 of the lever 9 is rounded to form a cam-face, which bears against the top edge of the movable cutter, and the loose connection of the link and cutter permits the latter to be raised and lowered within its guides, as illustrated by dotted lines in Fig. 2. The lever 9 is formed on opposite sides and above its fulcrum 11 with oppositely-beveled shoulders 15, supported on rounded bearings 5ª, which serve as stops to limit the movement of the lever.

16 designates a knife supported upon the base 1 and adjustable vertically by means of set-screws 17.

Projecting from the side plate 2 is a bracket 18, upon which is fulcrumed a lever 19, provided with a handle 20 and having welded thereto a steel plate 21, constituting a trimming-knife. The lever 19 extends through a slot 22, formed in the side plate. In connection with this trimming-knife we preferably employ a cam-lever 23, fulcrumed upon a bracket 24, projecting from the side plate 2. This cam-lever serves to firmly clamp the plate to be trimmed.

The peculiar angular shape of the trimming-knife, as shown in Fig. 4, greatly facilitates the trimming of the plates.

The operation of the machine will be readily understood. The cutting-blade 7 is lowered by a single movement of the lever either toward or from the operator, and the knives employed insure a clean cut even between thinly-spaced lines.

As no springs are required to retract the cutting-plate, there is little liability of the machine getting out of order.

We claim—

1. A machine for cutting stereotype-plates comprising a base having a fixed side plate formed with an upwardly-projecting tongue and provided with a vertical groove, the detachable side having a top formed with a slot, and provided with a vertical groove, the fixed knife supported on the base, a movable cutting-blade having a pin, a link having a slot receiving the pin, and a lever extending through, and fulcrumed in, the slot of the top and connected with the link.

2. A machine for cutting stereotype-plates comprising a base having a fixed side plate formed with an upwardly-projecting tongue and provided with a vertical groove, the detachable side having a top formed with a slot and provided with a vertical groove, the adjustable fixed knife supported on the base, a movable cutting-blade having a pin, a link having a slot receiving the pin, and a lever extending through, and fulcrumed in, the slot of the top and connected with the link.

3. A machine for cutting stereotype-plates comprising a base having a fixed side plate formed with an upwardly-projecting tongue and provided with a vertical groove, the detachable side having a top formed with rounded bearings and provided with a vertical groove, the fixed knife supported on the base, a movable cutting-blade having a pin, a link having a slot receiving the pin, and a lever fulcrumed to the top having a cam-face bearing on the movable cutting-blade, formed with oppositely-beveled shoulders working on the rounded bearings.

4. A machine for cutting stereotype-plates comprising a base having a fixed side formed with a vertical slot, a horizontal bracket projecting from one side of the slot, a lever fulcrumed to the bracket and extending through the slot and carrying a trimming-knife, a vertical bracket projecting above the side, and a cam-lever fulcrumed to the vertical bracket and adapted to clamp a stereotype-plate.

In testimony whereof we affix our signatures in presence of two witnesses.

WILLIAM P. NISBETT.
PETER ANDREWS.

Witnesses:
FRANK E. MARKHAM,
A. B. COGGER.